(12) United States Patent
Surawski

(10) Patent No.: US 12,371,171 B2
(45) Date of Patent: Jul. 29, 2025

(54) VAPOR CYCLE LIQUID CABIN COOLING SYSTEM

(71) Applicant: Hamilton Sundstrand Corporation, Charlotte, NC (US)

(72) Inventor: Eric Surawski, Hebron, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 143 days.

(21) Appl. No.: 17/875,002

(22) Filed: Jul. 27, 2022

(65) Prior Publication Data

US 2023/0382536 A1 Nov. 30, 2023

Related U.S. Application Data

(60) Provisional application No. 63/346,042, filed on May 26, 2022.

(51) Int. Cl.
  *B64D 13/08* (2006.01)
  *F28D 21/00* (2006.01)
  *B64D 13/06* (2006.01)

(52) U.S. Cl.
  CPC .............. *B64D 13/08* (2013.01); *F28D 21/00* (2013.01); *B64D 2013/0603* (2013.01); *F28D 2021/0021* (2013.01)

(58) Field of Classification Search
  CPC ........ B64D 13/08; B64D 13/06; B64D 13/02; B64D 13/006; B64D 2013/0618; B64D 2013/0688; B64D 2013/0611; B64D 2013/064; B64D 2013/0644; B64D 2013/0655; B64D 2221/00; B64D 33/02; B64D 33/04; F02C 6/08
  See application file for complete search history.

(56) References Cited

U.S. PATENT DOCUMENTS

| | | | |
|---|---|---|---|
| 2,966,047 A | 12/1960 | Paravicini | |
| 4,487,034 A | 12/1984 | Cronin et al. | |
| 4,966,005 A | 10/1990 | Cowell et al. | |
| 5,921,092 A | 7/1999 | Behr et al. | |
| 8,936,071 B2 | 1/2015 | Bruno et al. | |
| 9,879,610 B2* | 1/2018 | Moes | B64D 13/08 |
| 2001/0025507 A1* | 10/2001 | Buchholz | B64D 13/06 62/402 |

(Continued)

FOREIGN PATENT DOCUMENTS

| DE | 102016115824 A1 | 3/2018 |
|---|---|---|
| EP | 2703752 A1 | 3/2014 |

OTHER PUBLICATIONS

Extended European Search Report for EP Application No. 23175458.1, dated Oct. 2, 2023, 8 pages.

*Primary Examiner* — Gordon A Jones
(74) *Attorney, Agent, or Firm* — Kinney & Lange, P.A.

(57) ABSTRACT

A vapor cycle liquid cooling system for an aircraft includes a liquid vapor cycle system, an air handling unit, and a liquid loop in thermal communication with the liquid vapor cycle system and the air handling unit. The liquid vapor cycle system includes a cooling liquid outlet configured to deliver a cooling liquid in the liquid loop and a heating liquid outlet configured to deliver a heating liquid in the liquid loop. The vapor cycle liquid cooling system is configured to deliver the cooling liquid to the air handling unit and is configured to modulate a flow of the heating liquid to the air handling unit.

14 Claims, 3 Drawing Sheets

(56) References Cited

U.S. PATENT DOCUMENTS

2012/0137712 A1    6/2012  Truemper
2018/0305030 A1*  10/2018  Galzin .................. B64D 13/06
2021/0122478 A1*  4/2021  Mackin ................. B64D 13/06

* cited by examiner

VAPOR CYCLE LIQUID CABIN COOLING SYSTEM

CROSS-REFERENCE TO RELATED APPLICATION(S)

This application claims the benefit of U.S. Provisional Application No. 63/346,042 filed May 26, 2022 for "VAPOR CYCLE LIQUID CABIN COOLING SYSTEM" by E. Surawski.

BACKGROUND

The present disclosure is directed generally to aircraft environmental control systems and, more particularly, to a vapor cycle liquid cabin cooling system. Vapor cycle systems (VCSs) have been used for aircraft environmental control systems for cabin and avionic cooling. A typical VCS is a closed loop system that includes a compressor, condenser, expansion device, and evaporator with a refrigerant that continuously circulates through the components. The refrigerant enters the compressor as a vapor and is compressed, increasing a temperature and pressure of the refrigerant. The refrigerant is cooled to a liquid phase in the condenser and heat is rejected (typically to ambient air). The refrigerant is expanded through the expansion device reducing a pressure of the refrigerant, thereby forming a saturated liquid/vapor mixture at a lower temperature, which enters the evaporator. The refrigerant is expanded in the evaporator, changing form a liquid to vapor phase and absorbing heat from cooling fluid (e.g., air in a cabin to be cooled). Although VCSs can provide improved efficiency over traditional air cycle machines and are more compatible with modern electrical aircraft, VCSs introduce reliability issues in aerospace applications. Because VCSs are capable of producing more cooling capacity than needed, cooling demand is typically met by intermittent operation of the VCSs (i.e. turning VCSs off and on) or by varying a speed of a compressor of the VCSs. Start and stop cycles can wear out mechanical components of the compressor. Lowering a speed of the compressor can result in loss of lubrication to the compressor.

More reliable systems incorporating VCSs into aircraft environmental control systems are desired.

SUMMARY

In one aspect, a vapor cycle liquid cooling system for an aircraft includes a liquid vapor cycle system, an air handling unit, and a liquid loop in thermal communication with the liquid vapor cycle system and the air handling unit. The liquid vapor cycle system includes a cooling liquid outlet configured to deliver a cooling liquid in the liquid loop and a heating liquid outlet configured to deliver a heating liquid in the liquid loop. The vapor cycle liquid cooling system is configured to deliver the cooling liquid to the air handling unit and is configured to modulate a flow of the heating liquid to the air handling unit.

In another aspect, a method for providing cooling in an aircraft environmental control system includes heating, with a vapor cycle system, a first portion of a liquid in a liquid loop to provide a heating liquid, cooling, with the vapor cycle system, a second portion of a liquid in the liquid loop to provide a cooling liquid, delivering all cooling liquid to an air handling unit, and modulating delivery of the heating liquid to the air handling unit. The liquid loop is in thermal communication with a refrigerant of the vapor cycle system.

The present summary is provided only by way of example, and not limitation. Other aspects of the present disclosure will be appreciated in view of the entirety of the present disclosure, including the entire text, claims and accompanying figures.

Figure 1:
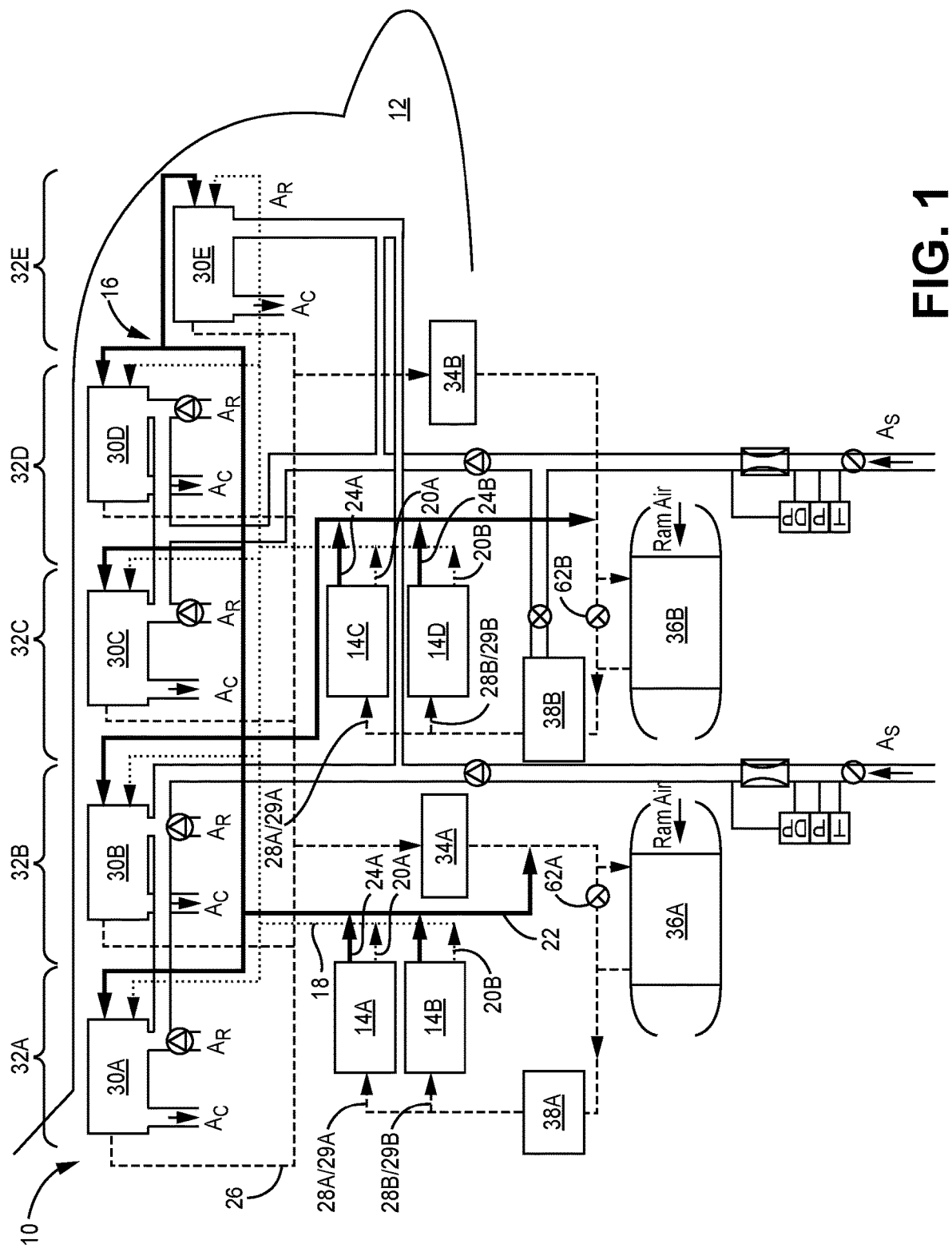
FIG. 1 is a schematized view of a vapor cycle liquid cooling system for an aircraft environmental control system.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

A vapor cycle liquid cooling system including one or more vapor cycle systems (VCSs) and a liquid loop in thermal communication with the one or more VCSs can be used for cabin and avionic cooling of an aircraft. The disclosed vapor cycle liquid cooling system can be designed to maintain constant load or operating point (constant compressor speed) on the one or more VCSs and minimize the need for heat sink cooling flow. By maintaining a constant operating point, the disclosed system can provide efficient cooling with improved reliability. Controlled delivery of waste heat generated by the constant operation of the one or more VCSs to thermal loads can prevent overcooling of the aircraft.

In the present disclosure, a VCS is in thermal communication with a closed loop liquid cooling system including cooling liquid conduits with cooling liquid received from the VCS, heating liquid conduits with heating liquid received from the VCS, and mixed heating/cooling liquid conduits with mixed heating/cooling liquid, which is delivered back to the VCS where a portion of the mixed heating/cooling liquid is heated and a portion is cooled by the VCS. All cooling liquid is delivered via the cooling liquid conduits to a thermal load (e.g. aircraft cabin) during operation of the VCS. Because the VCS is run at a constant operating point (constant compressor speed), overcooling can occur with constant delivery of the cooling liquid. To prevent overcooling, the heating liquid delivered via the heating liquid conduits can be mixed with the cooling liquid at the thermal load to modulate a temperature of the cooling liquid to meet a cooling or heating demand. The mixed heating/cooling liquid can be returned to the VCS via the mixed heating/cooling liquid conduits. Excess heat can be rejected to a heat sink (e.g., ram air) via a heat exchanger before the mixed heating/cooling liquid is returned to the VCS. The temperature of the heating and cooling liquid entering the VCS can be regulated to maintain a constant fluid temperature at a VCS inlet.

Figure 2:
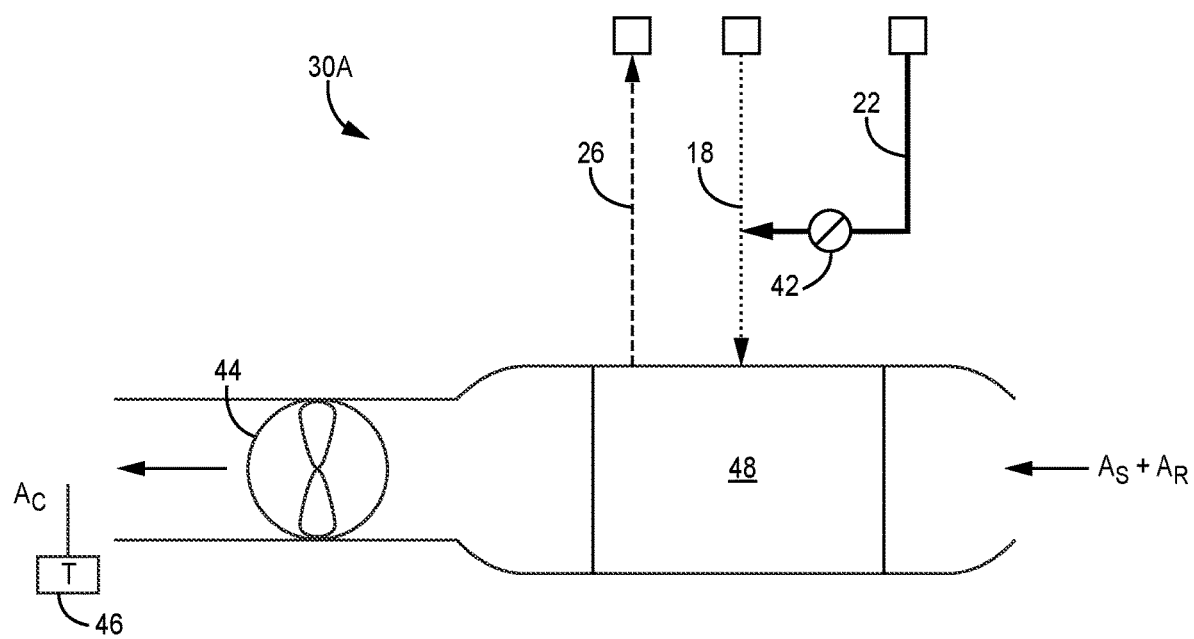
FIG. 2 is a schematized view of a cabin zone air handling unit.
Figure 3:
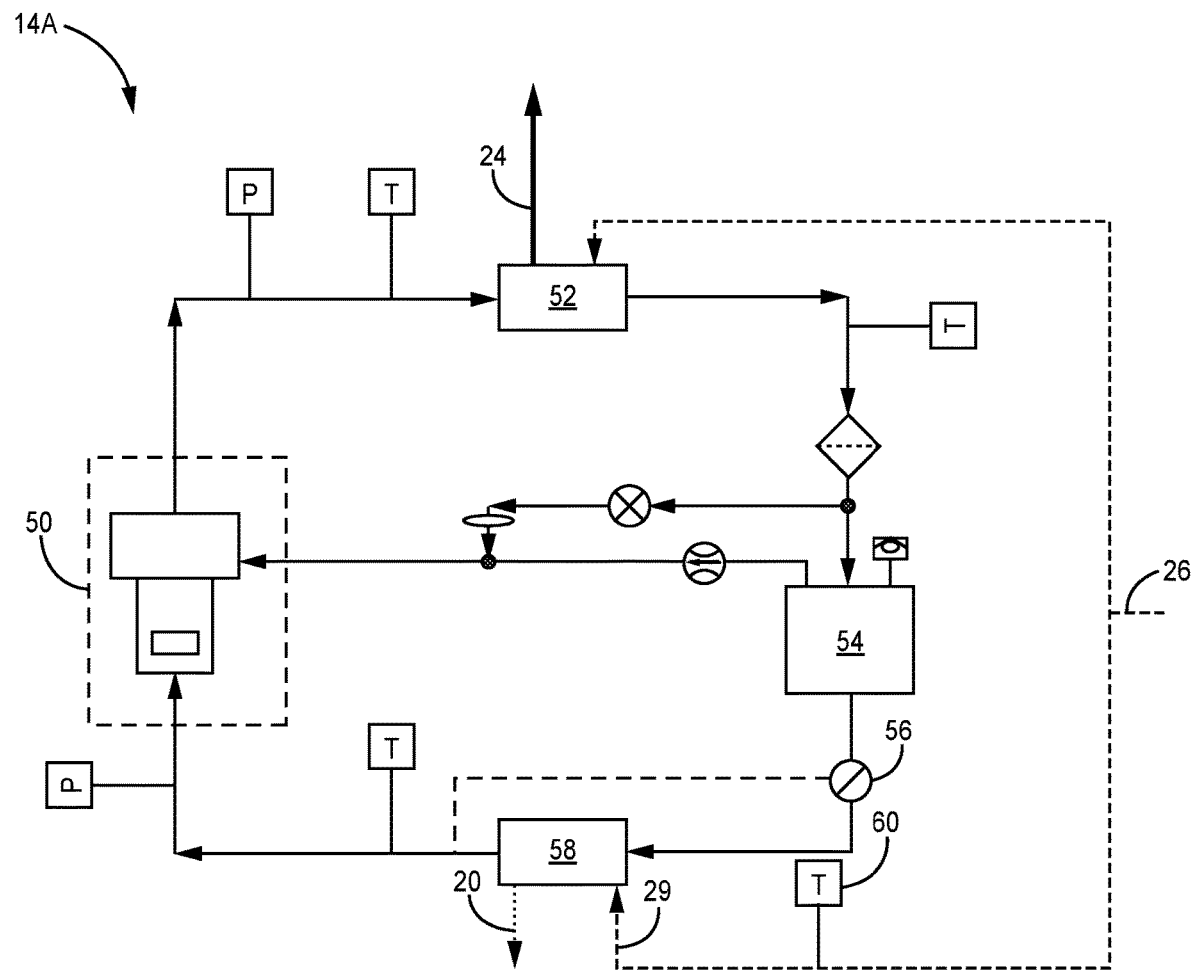
FIG. 3 is a schematized view of a vapor cycle system (VCS).

FIGS. 1-3 are discussed together. FIG. 1 is a schematized view of cooling system 10 for an environmental control system of aircraft 12. FIG. 1 shows VCSs 14A-14D; closed heating and cooling liquid loop 16 with cooling liquid conduits 18 (shown as dotted lines), cooling liquid outlets 20A-20D, heating liquid conduits 22 (shown as solid lines), heating liquid outlets 24A-24D, mixed heating/cooling liquid conduits 26 (shown as dashed lines), and mixed heating/cooling liquid inlets 28/29A-28/29D (arrows indicate the direction of liquid flow); zone load coolers 30A-30D in cabin zones 32A-32D, and zone load cooler 30E in flight deck 32E; fresh air supply $A_S$; recirculating air supply $A_R$; cabin zone air supply $A_C$; electrical load coolers (avionic coolers) 34A, 34B; heat exchangers 36A, 36B; and cooling pumps 38A, 38B.

FIG. 2 is schematized view of a single zone load cooler 30A-30E. FIG. 2 shows zone load cooler 30A, cooling liquid conduit 18, heating liquid conduit 22, mixed heating/cooling liquid conduit 26, liquid temperature control valve 42, fan 44, heat exchanger 48, fresh air supply $A_S$, recirculating air supply $A_R$, cabin zone air supply $A_C$, and air temperature sensor 46. FIG. 3 is a schematized view of a single VCSs 14A-14D.

FIG. 3 shows VCS 14A, compressor 50, condenser 52, flash tank 54, expansion valve 56, evaporator 58, cooling liquid outlet 20A, heating liquid outlet 24A, mixed heating/cooling liquid inlets 28A and 29A, and temperature sensor 60 of mixed heating/cooling liquid conduit 26. VCS 14A includes multiple valves, pressure sensors, temperature sensors, and bypass conduits, and other conventional components shown but not labeled.

FIG. 1 shows an aircraft divided into four cabin zones 32A-32D, each having a separate zone load cooler 30A-30D for heating and cooling. It will be understood by one of ordinary skill in the art that the disclosed vapor cycle liquid cabin cooling system can be adapted for use with any number of zone load coolers and cabin zones and is not limited to any particular type or size of aircraft. Furthermore, the number of VCSs can be adapted to accommodate varying cooling demands.

Each VCS 14A-14D functions as a liquid heating and cooling unit configured to reject heat to and absorb heat from a fluid contained in closed heating and cooling liquid loop 16, which is used to cool thermal loads of aircraft 12, including cabin zones 32A-32D, flight deck 32E, and electrical load coolers 34A and 34B. As illustrated in FIG. 3, VCS 14A has a conventional design including compressor 50, condenser 52, flash tank 54, expansion valve 56, and evaporator 58 with a refrigerant that continuously circulates through the components. The refrigerant enters compressor 50 as a vapor and is compressed increasing a temperature and pressure of the refrigerant. The refrigerant is cooled to a liquid phase in condenser 52 and heat is rejected to heating liquid in heating and cooling liquid loop 16, which is in thermal communication with condenser 52. Heating liquid enters VCS 14A in heating and cooling liquid loop 16 via mixed heating/cooling liquid conduit 26 at mixed heating cooling inlet 28 and is discharged from VCS 14A at heating liquid outlet 24A. The refrigerant is collected in flash tank 54 and expanded through expansion valve 56 reducing a pressure of the refrigerant forming a saturated liquid/vapor mixture at a lower temperature, which enters evaporator 58. The refrigerant is expanded in evaporator 58, changing form a liquid to vapor phase and absorbing heat from cooling liquid in heating and cooling liquid loop 16, which is in thermal communication with evaporator 58. Heating/cooling fluid enters VCS 14A via mixed heating/cooling liquid conduit 26 at mixed heating/cooling inlet 29 and is discharged from VCS 14A at cooling liquid outlet 20A.

VCS 14 can include multiple valves, pressure sensors, temperature sensors, and bypass conduits, and other components shown but not labeled for the functioning of VCS 14A as known in the art.

As will be described further herein, a temperature of heating/cooling liquid entering VCS 14A via mixed heating/cooling inlets 28 and 29 can be kept constant during operation of VCS 14 as measured by temperature sensor 60.

Refrigerant can be any refrigerant known in the art suitable for aircraft cooling applications, including, for example, R134a, R1234yf, R1234ze. The refrigerant loop is confined in VCS 14 and used only for indirect cooling of cabin zones 32A-32D, flight deck 32E, and electrical load coolers 34A and 34B (i.e., the refrigerant does not directly cool cabin air supply $A_C$ or electronic components). VCSs 14A-14D can be operated at a constant operating point (constant compressor speed) during operation of aircraft 12. The operation of VCSs 14A-14D is independent of the aircraft cooling demand and the speed of compressor 50 is maintained regardless of changes in cooling demand during flight. As such, VCSs 14A-14D can be operated with limited control.

Heating and cooling liquid loop 16 is in thermal communication with VCSs 14A-14D and thermal loads requiring cooling—in this case, zone load coolers 30A-30E and electrical load coolers 34A and 34B. Heating and cooling liquid loop 16 is a closed loop system with a recirculating heating/cooling liquid. The heating/cooling liquid can be, for example, an antifreeze water mixture including, for example, ethylene glycol water or propylene glycol water, or fluid capable of remaining in a liquid phase at ambient temperatures of aircraft operation. Heating and cooling liquid loop 16 can be formed of solid metallic tubes or flexible plastic tubing.

Heating and cooling liquid loop 16 includes cooling liquid conduits 18, heating liquid conduits 22, and mixed heating/cooling liquid conduits 26. Cooling liquid conduits are in fluid communication with cooling liquid outlets 20A-20D and are configured to carry cooling liquid discharged from cooling liquid outlets 20A-20D of VCSs 14A-14D. Heating liquid conduits 22 are in fluid communication with heating liquid outlets 24A-24D and are configured to carry heating liquid discharged from VCSs 14A-14D from heating liquid outlets 24A-24D. Mixed heating/cooling liquid conduits 26 are in fluid communication with mixed heating/cooling inlets 28A/29A-28D-29D and are configured to carry a mixture of cooling liquid and heating liquid or cooling liquid that has absorbed heat from thermal loads (e.g., at zone load coolers 30A-30E).

Vapor cycle liquid cooling system 10 is configured to deliver all cooling capacity (i.e., all cooling liquid discharged from VCSs 14A-14D) to each thermal load at all times of operation. As illustrated in FIG. 1, all cooling liquid discharged from VCSs 14A-14D is delivered to zone load coolers 30A-30E via cooling liquid conduits 18, which extend from VCSs 14A-14D to zone load coolers 30A-30E. Because operation of VCSs 14A-14D can maintained at a steady state with a constant temperature of mixed heating/cooling liquid at mixed heating/cooling inlets 28A/29A-28D-29D, cooling liquid can be maintained at a constant temperature at cooling liquid outlets 20A-20D.

Cooling liquid conduits 18 can be arranged and/or combined in any configuration. As illustrated in FIG. 1. Cooling liquid outlets 20A and 20B can feed a first leg of cooling liquid conduit 18, while cooling liquid outlets 20C and 20D can feed a second leg of cooling liquid conduit 18. The first and second legs of cooling liquid conduit 18 can be combined upstream of zone load coolers 30A-30E before branching into separate conduits to feed each zone load cooler 30A-30E. Arrows indicate the direction of cooling liquid flow from VCSs 14A-14D to zone load coolers 30A-30E.

Vapor cycle liquid cooling system 10 is configured to modulate a flow of heating liquid to zone load coolers 30A-30D. Heating liquid can be delivered to zone load coolers 30A-30D (or other thermal loads) via heating liquid conduit 22 to adjust a temperature of the cooling liquid at the thermal load as needed to prevent overcooling. Heating liquid is discharged from VCSs 14A-14D via heating liquid outlets 24A-24D. Because operation of VCSs 14A-14D can maintained at a steady state with a constant temperature of mixed heating/cooling liquid at mixed heating/cooling inlets 28A/29A-28D-29D, heating liquid can be maintained at a constant temperature at heating liquid outlets 24A-24D.

As illustrated in FIG. 1, heating liquid conduits 22 can be arranged in a similar configuration as cooling liquid conduits 18, with heating liquid outlets 24A and 24B feeding a first leg of heating liquid conduit 22 and heating liquid outlets 24C and 24D feeding a second leg of heating liquid conduits 22. The first and second legs of heating liquid conduits 22 can be combined upstream of zone load coolers 30A-30E before branching into separate conduits to feed each zone load cooler 30A-30E. As illustrated in FIG. 2 and discussed further herein, heating liquid conduits 22 can be in valved or interruptible fluid communication with cooling liquid conduits 18. Heating liquid conduits 22 can include liquid temperature control valve 42, which can control a flow of heating liquid into cooling liquid conduit 18 at each zone load cooler 30A-30E.

VCSs 14A-14D produce more heating capacity than needed. Excess heating liquid can be delivered to heat exchanger 36A and 36B to be cooled. For example, excess heating liquid can be cooled by ram air at heat exchangers. As illustrated, heating liquid conduits 22 extend both from VCSs 14A-14D to zone load coolers 30A-30E and from VCSs 14A-14D to mixed heating/cooling liquid conduits 26 upstream of heat exchangers 36A and 36B. Arrows indicate the direction of flow of heating liquid from VCSs 14A-14D to zone load coolers 30A-30E and heat exchangers 36A and 36B.

Mixed heating/cooling liquid conduits 26 can carry cooling liquid that has absorbed heat from cabin zones 32A-32D and flight deck 32E in zone load coolers 30A-30E and any additional heating liquid that has been supplied to zone load coolers 30A-30E. In other words mixed heating/cooling liquid is produced by mixing heating liquid with cooling liquid at zone load coolers 30A-30E and/or by heating cooling liquid with, for example, an air-to-liquid heat exchanger of zone load coolers 30A-30E. Mixed heating/cooling liquid is discharged from zone load coolers 30A-30E.

Mixed heating/cooling liquid can be used to cool electrical loads. Mixed heating/cooling liquid conduits 26 can be combined in a single mixed heating/cooling liquid conduit 26 upstream of electrical load coolers 34A and 34B before branching to be delivered to each of electrical load coolers 34A and 34B in separate mixed heating/cooling liquid conduits 26. Heating/cooling liquid can be used to cool electrical components, for example, by an air-to-liquid heat exchanger or by any heat exchange means known in the art. Mixed heating/cooling liquid leaving electrical load coolers 34A and 34B can be directed to heat exchangers 36A and 36B before being returned to VCSs 14A-14D. Arrows indicate the direction of mixed heating/cooling liquid flow.

As illustrated in FIG. 1, excess heating liquid in heating liquid conduit 22 can be combined with mixed heating/cooling liquid downstream of electrical load coolers 34A and 34B relative to a flow of the mixed heating/cooling liquid.

Heat exchangers 36A and 36B can be, for example, ram air heat exchangers configured to exchange heat between ram air flow and the mixed heating/cooling liquid, which includes excess heating liquid from heating liquid conduit 22. Heat exchangers 36A and 36B can have any air-to-liquid heat exchange configuration known in the art. All or a portion of the mixed heating/cooling liquid can be cooled by ram air in heat exchangers 36A and 36B depending on a temperature of the mixed heating/cooling liquid and ram air temperature. Vapor cycle liquid cooling system 10 can be configured to maintain a constant mixed heating/cooling liquid temperature at inlets 28A-28D and 29A-29D of VCSs 14A-14D. Mixed heating/cooling liquid conduits 26 can include bypass valves 62A and 62B to allow all or a portion of the mixed heating/cooling liquid to bypass heat exchangers 36A and 36B to prevent overcooling of the mixed heating/cooling liquid. Temperature sensor 60 (FIG. 3) can detect a temperature of the mixed heating/cooling liquid entering VCSs 14A-14D and can trigger the opening or closing of valves 62A and 62B to modulate the cooling of the mixed heating/cooling liquid in mixed heating/cooling liquid conduits 26.

As illustrated in FIG. 1, the branches of mixed heating/cooling liquid conduits 26 received at electrical load coolers 34A and 34B can remain separate and feed different subsets of VCSs 14A-14D. The portion of the mixed heating/cooling liquid used to cool electrical load cooler 34A can be delivered to heat exchanger 36A before being returned to VCSs 14A and 14B, while the portion of the mixed heating/cooling liquid leaving electrical load cooler 34B can be delivered to heat exchanger 36B before being returned to VCSs 14C and 14D. As illustrated in FIG. 3, the mixed heating/cooling liquid can be further divided into separate mixed heating/cooling liquid conduits 26 at VCSs 14A-14D, where a portion of the mixed heating/cooling liquid can be delivered to VCSs 14A-14D via inlet 28A-28D to be heated and discharged via heating liquid outlets 24A-24D and a portion can be delivered to VCSs 14A-14D via inlet 29A-29D to be cooled and discharged via cooling liquid outlets 20A-20D.

It will be understood by one of ordinary skill in the art that alternative routing configurations and combinations of cooling liquid conduits 18, heating liquid conduits 22, and mixed heating/cooling liquid conduits 26 fall within the scope of the present disclosure and can be optimized to accommodate cooling demand and varying numbers and arrangements of VCSs and thermal loads.

Cooling pumps 38A and 38B maintain circulation of the cooling liquid, heating liquid, and mixed heating/cooling liquid through cooling liquid conduits 18, heating liquid conduits 22, and mixed heating/cooling liquid conduits 26, respectively. Cooling pumps can be any type of liquid pump known in the art and suitable for pumping antifreeze or other suitable liquid.

FIG. 2 further illustrates the control of cooling and heating liquid to zone load coolers 30A-30E. Zone load cooler 30A in cabin zone 32A is shown as an example. Each zone load cooler 30A-30E can have the same configuration. Zone load cooler 30A can be an air handling unit including air-to-liquid heat exchanger 48, fan 44, liquid temperature control valve 42, and air temperature sensor 46. Fan 44 can recirculate air $A_R$ from cabin zone 32A or circulate a thermal load across heat exchanger 48 to provide heating/cooling to cabin zone 32A. Both a fresh air supply $A_S$ and a recirculating air supply $A_R$ can be delivered to heat exchanger 48. As illustrated and previously described, all cooling liquid is delivered heat exchanger 48 of zone load cooler 30A via cooling liquid conduit 18 during aircraft operation regardless of cooling demand. Air temperature sensor 46 can measure a temperature of cabin air $A_C$, which can vary between flights and in-flight due to variations in heat sources (e.g., number of people, in-flight entertainment, personal computers, etc.) Typically, zone load coolers are configured to maintain a cabin temperature between 65° F. and 85° F. in each cabin zone. When the temperature of cabin air $A_C$ falls below a preset temperature (e.g., below 65° F.), air temperature sensor 46 can trigger the opening of liquid temperature control valve 42 to mix heating liquid from heating liquid conduit 22 discharged from VCSs 14A-14D with cooling liquid to achieve a desired cabin air temperature. Once the desired cabin air temperature is reached, air temperature sensor 46 can trigger liquid temperature control valve 42 to close. As previously described, VCSs 14A-14D create more heating capacity than needed. Excess heating liquid can be delivered to heat exchangers 36A and 36B via mixed heating/cooling liquid conduit 26 to be cooled before being returned to VCSs 14A-14D.

The disclosed vapor cycle liquid cabin cooling system can be used for efficient cabin and avionic cooling of an aircraft with improved reliability. Each VCS can be run at a constant operating point during operation of aircraft 12 and, as such, can be operated with limited control. Control of cooling capacity can be achieved by modulating the mixing of heating liquid discharged from the VCS with cooling liquid discharged from the VCS in the closed heating and cooling liquid loop at the location of the thermal load (e.g., cabin zone). All mixed heating/cooling liquid can be returned to the VCS at a constant temperature maintained by modulation of flow of mixed heating/cooling liquid through an air-to-liquid heat exchanger (e.g., ram air heat exchanger).

It will be understood by one of ordinary skill in the art that the number of VCSs, thermal load coolers, types of air-to-liquid heat exchangers, and heating and cooling liquid loop configurations can be varied without departing from the scope of the present disclosure.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A vapor cycle liquid cooling system for an aircraft includes a liquid vapor cycle system, an air handling unit, and a liquid loop in thermal communication with the liquid vapor cycle system and the air handling unit. The liquid vapor cycle system includes a cooling liquid outlet configured to deliver a cooling liquid in the liquid loop and a heating liquid outlet configured to deliver a heating liquid in the liquid loop. The vapor cycle liquid cooling system is configured to deliver the cooling liquid to the air handling unit and is configured to modulate a flow of the heating liquid to the air handling unit.

The vapor cycle liquid cooling system of the preceding paragraph can optionally include, additionally and/or alternatively, any one or more of the following features, configurations and/or additional components:

The vapor cycle liquid cooling system of the preceding paragraphs, wherein the liquid loop can include a cooling liquid conduit in fluid communication with the cooling liquid outlet and the air handling unit and a heating liquid conduit in fluid communication with the heating liquid outlet and in interruptible fluid communication with the cooling liquid conduit.

The vapor cycle liquid cooling system of any of the preceding paragraphs, wherein the liquid loop can further include a mixed heating/cooling liquid conduit, wherein the mixed heating/cooling liquid conduit is in fluid communication with the cooling liquid conduit and the heating liquid conduit and is in thermal communication with the vapor cycle system.

The vapor cycle liquid cooling system of any of the preceding paragraphs can further include a ram air heat exchanger configured to receive mixed heating/cooling liquid from the mixed heating/cooling liquid conduit.

The vapor cycle liquid cooling system of any of the preceding paragraphs, wherein the ram air heat exchanger can be disposed upstream of the vapor cycle system with respect to a flow of the mixed heating/cooling liquid.

The vapor cycle liquid cooling system of any of the preceding paragraphs can further include a bypass conduit configured to allow a flow of the mixed heating/cooling liquid to bypass the ram air heat exchanger based on a sensed temperature of mixed heating/cooling liquid at an inlet of the vapor cycle system.

The vapor cycle liquid cooling system of any of the preceding paragraphs, wherein the mixed heating/cooling liquid conduit can be divided to direct a portion of the mixed heating/cooling liquid to a condenser of the vapor cycle system to be heated and discharged in the heating liquid outlet and to direct a portion of the mixed heating/cooling liquid to an evaporator to be cooled and discharged in the cooling liquid outlet.

The vapor cycle liquid cooling system of any of the preceding paragraphs can further include an electrical load cooler in thermal communication with the mixed heating/cooling liquid conduit.

The vapor cycle liquid cooling system of any of the preceding paragraphs, wherein the heating liquid conduit can be in fluid communication with the mixed heating/cooling liquid conduit downstream of the electrical load cooler relative to a flow of the mixed heating/cooling liquid.

The vapor cycle liquid cooling system of any of the preceding paragraphs, wherein the air handling unit can include an air-to-liquid heat exchanger for cabin zone cooling of the aircraft.

The vapor cycle liquid cooling system of any of the preceding paragraphs can further include an air temperature sensor configured to measure a temperature of the cabin zone, and a liquid temperature control valve disposed in the heating liquid conduit. The liquid temperature control valve can be configured to open and close based on a temperature sensed by the air temperature sensor. The liquid temperature control valve can be configured to deliver heating liquid to the cooling liquid conduit when the liquid temperature control valve is open.

The vapor cycle liquid cooling system of any of the preceding paragraphs, wherein the vapor cycle liquid cooling system can be configured to deliver all cooling liquid to the air handling unit.

The vapor cycle liquid cooling system of any of the preceding paragraphs, wherein the vapor cycle system can include a compressor configured for operation at a single speed during operation of the vapor cycle system.

The vapor cycle liquid cooling system of any of the preceding paragraphs, wherein operation of the vapor cycle system can be independent of aircraft cooling demand.

A method for providing cooling in an aircraft environmental control system includes heating, with a vapor cycle system, a first portion of a liquid in a liquid loop to provide a heating liquid, cooling, with the vapor cycle system, a second portion of a liquid in the liquid loop to provide a cooling liquid, delivering all cooling liquid to an air handling unit, and modulating delivery of the heating liquid to the air handling unit. The liquid loop is in thermal communication with a refrigerant of the vapor cycle system.

The method of the preceding paragraph can optionally include, additionally and/or alternatively, any one or more of the following features, configurations, additional components, and/or steps:

The method of the preceding paragraphs can further include operating a compressor of the vapor cycle system at a constant speed and independent of a cooling demand of the aircraft.

The method of any of the preceding paragraphs can further include delivering excess heating liquid to a ram air heat exchanger to be cooled.

The method of any of the preceding paragraphs, can further include delivering a mixed heating/cooling liquid to an electrical load cooler, wherein the mixed heating/cooling liquid is produced by mixing the heating liquid with the cooling liquid at the air handling unit and/or by heating the cooling liquid with an air-to-liquid heat exchanger of the air handling unit.

The method of any of the preceding paragraphs can further include combining the excess heating liquid with the mixed heating/cooling liquid downstream of the electrical load cooler and cooling the mixed heating/cooling liquid including the excess heating liquid with the ram air heat exchanger disposed in flow communication between the electrical load cooler and the vapor cycle system.

The method of any of the preceding paragraphs, wherein the first and second portions of the liquid can include the mixed heating/cooling liquid received from the ram air heat exchanger.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A vapor cycle liquid cooling system for an aircraft comprises:
   a vapor cycle system comprising:
      a condenser;
      an evaporator in fluid communication with the condenser;
      a refrigerant, wherein the refrigerant circulates through the condenser and the evaporator; and
      a cooling liquid outlet and a heating liquid outlet;
   one or more air handling units; and
   a liquid loop in thermal communication with the vapor cycle system and the one or more air handling units;
   wherein the cooling liquid outlet is in direct thermal communication with the evaporator and is configured to deliver a cooling liquid in the liquid loop, and the heating liquid outlet is in direct thermal communication with the condenser and is configured to deliver a heating liquid in the liquid loop; and
   wherein the vapor cycle liquid cooling system is configured to deliver the cooling liquid from the cooling liquid outlet to the one or more air handling units and is configured to modulate a flow of the heating liquid to the one or more air handling units.

2. The vapor cycle liquid cooling system of claim 1, wherein the liquid loop comprises:
   one or more cooling liquid conduits in uninterruptible fluid communication with the cooling liquid outlet and the one or more air handling units, such that all cooling liquid provided through the cooling liquid outlet is delivered to the one or more air handling units; and
   a heating liquid conduit in fluid communication with the heating liquid outlet and in interruptible fluid communication with the one or more cooling liquid conduits.

3. The vapor cycle liquid cooling system of claim 2, wherein the liquid loop further comprises a mixed heating/cooling liquid conduit, wherein the mixed heating/cooling liquid conduit is in fluid communication with the cooling liquid conduit and the heating liquid conduit and is in thermal communication with the vapor cycle system.

4. The vapor cycle liquid cooling system of claim 3, and further comprising a ram air heat exchanger configured to receive mixed heating/cooling liquid from the mixed heating/cooling liquid conduit.

5. The vapor cycle liquid cooling system of claim 4, wherein the ram air heat exchanger is disposed upstream of the vapor cycle system with respect to a flow of the mixed heating/cooling liquid.

6. The vapor cycle liquid cooling system of claim 5, and further comprising a bypass conduit configured to allow a flow of the mixed heating/cooling liquid to bypass the ram air heat exchanger based on a sensed temperature of the mixed heating/cooling liquid at an inlet of the vapor cycle system.

7. The vapor cycle liquid cooling system of claim 3, wherein the mixed heating/cooling liquid conduit is divided to direct a portion of the mixed heating/cooling liquid to the condenser of the vapor cycle system to be heated and discharged in the heating liquid outlet and to direct a portion of the mixed heating/cooling liquid to the evaporator to be cooled and discharged in the cooling liquid outlet.

8. The vapor cycle liquid cooling system of claim 3, and further comprising an electrical load cooler in thermal communication with the mixed heating/cooling liquid conduit.

9. The vapor cycle liquid cooling system of claim 8, wherein the heating liquid conduit is in fluid communication with the mixed heating/cooling liquid conduit downstream of the electrical load cooler relative to a flow of the mixed heating/cooling liquid.

10. The vapor cycle liquid cooling system of claim 2, wherein the one or more air handling units comprises an air-to-liquid heat exchanger for cabin zone cooling of the aircraft.

11. The vapor cycle liquid cooling system of claim 10, and further comprising:
   an air temperature sensor configured to measure a temperature of the cabin zone; and
   a liquid temperature control valve disposed in the heating liquid conduit, wherein the liquid temperature control valve is configured to open and close based on a temperature sensed by the air temperature sensor, and wherein the liquid temperature control valve is configured to deliver heating liquid to the cooling liquid conduit when the liquid temperature control valve is open.

12. The vapor cycle liquid cooling system of claim 1, wherein the vapor cycle liquid cooling system is configured to deliver all cooling liquid to the one or more air handling units.

13. The vapor cycle liquid cooling system of claim 1, wherein the vapor cycle system comprises a compressor configured for operation at a single speed during operation of the vapor cycle system.

14. The vapor cycle liquid cooling system of claim 1, wherein operation of the vapor cycle system is independent of aircraft cooling demand.

* * * * *